(12) United States Patent
Holland et al.

(10) Patent No.: US 10,937,385 B1
(45) Date of Patent: Mar. 2, 2021

(54) FRAME REPLAY WITH BIT DEPTH CONSIDERATIONS

(71) Applicant: Apple Inc., Cupertino, CA (US)

(72) Inventors: Peter F. Holland, Los Gatos, CA (US); Malcolm D. Gray, Sunnyvale, CA (US); Mahesh B. Chappalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 16/545,955

(22) Filed: Aug. 20, 2019

(51) Int. Cl.
| G09G 5/00 | (2006.01) |
| G06T 1/20 | (2006.01) |
| G09G 5/393 | (2006.01) |
| G09G 5/395 | (2006.01) |
| G09G 5/37 | (2006.01) |
| G06T 1/60 | (2006.01) |
| H04B 1/3827 | (2015.01) |

(52) U.S. Cl.
CPC .............. *G09G 5/006* (2013.01); *G06T 1/20* (2013.01); *G06T 1/60* (2013.01); *G09G 5/37* (2013.01); *G09G 5/393* (2013.01); *G09G 5/395* (2013.01); *G09G 2320/103* (2013.01); *G09G 2330/023* (2013.01); *G09G 2340/02* (2013.01); *G09G 2340/16* (2013.01); *G09G 2350/00* (2013.01); *G09G 2360/12* (2013.01); *H04B 1/3827* (2013.01)

(58) Field of Classification Search
None
See application file for complete search history.

(56) References Cited

U.S. PATENT DOCUMENTS

| 2011/0249738 A1* | 10/2011 | Suzuki ................. H04N 19/184 375/240.12 |
| 2015/0178932 A1 | 6/2015 | Wyatt et al. |
| 2015/0243200 A1* | 8/2015 | Pan ......................... G06T 5/009 345/590 |
| 2016/0358584 A1* | 12/2016 | Greenebaum ......... G06T 11/001 |
| 2017/0011768 A1* | 1/2017 | Cho ................... G11B 20/0021 |
| 2018/0070095 A1 | 3/2018 | Chou |
| 2018/0084281 A1 | 3/2018 | Hsieh et al. |
| 2018/0293961 A1 | 10/2018 | Labbe et al. |

* cited by examiner

*Primary Examiner* — Ke Xiao
*Assistant Examiner* — Jed-Justin Imperial
(74) *Attorney, Agent, or Firm* — Fletcher Yoder, P.C.

(57) ABSTRACT

A method for operating a display pipe having a first bit depth and implemented in an electronic device may include determining a second bit depth of a display. The method may also include compressing first image data to the second bit depth, where the first image data corresponds to a first image to be presented via the display. The method may also include including buffer data with the first image data to generate processed image data and outputting the processed image data as output image data to cause presentation of the first image.

20 Claims, 10 Drawing Sheets

FRAME REPLAY WITH BIT DEPTH CONSIDERATIONS

BACKGROUND

The present disclosure relates generally to electronic displays and, more particularly, to the compression of data and use thereof in rendering images on the electronic displays.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. In any case, to display an image, an electronic display may control light emission (e.g., luminance) of its display pixels based at least in part on corresponding image data.

During operation, the images presented on the electronic display may be relatively dynamic (e.g., frequently changing) or relatively static (e.g., change infrequently). For example, a home screen, a representation of a page of a book or a website, a picture being displayed, or the like, may use relatively few (or even no) changes in the generated image displayed over a period of time (e.g., for multiple generated image frames). However, if the electronic device and/or the display generate images in a similar manner, regardless of the static or dynamic properties of the image to be generated (e.g., whether the image is to change from one frame to the next), excess processing, power usage, or the like may be unnecessarily exerted.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to devices and methods for increasing power conservation and/or reducing processing in an electronic display. In one embodiment, a display pipe may generate one or more frames of images and/or video sequences to be output for presentation on a display. However, situations may arise in which content of the successive frames do not change. In these situations, use of previously generated frames in place of generating a new frame (e.g., replay mode) may save both power in the device as well as processing bandwidth.

Thus, while it may be beneficial to utilize a previously generated frame when content of the frame is not changing, storage of the previously generated frame may impose unwanted overhead in the system. Accordingly, the display pipe include a compressor that compresses a generated frame and writes back the compressed frame to a compressed image buffer. The data in the compressed image buffer may be used as an alternative source for an image data in place of other source data for generating images for display on the display. The compressed image buffer data (e.g., the compressed image) may be decompressed via a decompressor to generate an image frame for presentation by the display.

Furthermore, in some embodiments, a bit depth of the display pipe may be larger than a bit depth of the display. In these situations, image data may be truncated (e.g., lost, altered) when transmitted from the display pipe to the display for use in presentation of an image. Accordingly, the display pipe may include a dither block that compresses the image data by a programmable amount based on the bit depth of the display (such as, based at least in part on a difference between the bit depth of the display pipe and the bit depth of the display). This compression of the image data generates compressed image data having a total data length equal to the bit depth of the display. After compression of the image data, the dither block may append buffer data (e.g., zeros or data included independent of the image data used in presentation of the image on the display) to the compressed image data to return a total data length to equal the bit depth of the display pipe. In this way, when the compressed image data (e.g., compressed image data and appended zero data) is transmitted to the display from the display pipe, the data truncation (e.g., truncation operations) may remove the buffer data (e.g., appended buffer data) without removing the compressed image data. In some cases, a bit depth expansion may be performed to increase a bit depth of a data packet including the compressed image data. The bit depth expansion may result in the data packet including both compressed image data and buffer data that was essentially appended to the compressed image data.

In display pipes that are able to operate in a replay mode, these considerations for bit depth reductions between the display pipe and the display may be included before compressing the frame for future replay. When compressing the compressed image data (e.g., to generate twice-compressed image data) for storage in the compressed image buffer, less memory may be used to store the twice-compressed image data (e.g., compressed once by the dither block and compressed a second time by the compressor) than may be used to store image data compressed once time via the compressor. It is noted that "bit depth," as used herein, refers to the data length (e.g., bit length) of image data used to represent luminance information for depicting an image on a display. The larger the bit depth of an image (e.g., the larger the number of bits used to represent a luminance corresponding to at least a portion of an image), the larger a range of luminance values that image data may be represented with, and thus the larger a range of color values may be presented via the display. For example, image data using 3 bits may represent 8 luminance values while image data using 1 bit may represent 2 luminance values. For this reason, different displays may present images using a larger number of luminance values than other displays. A display pipe may process image data using a bit depth unequal to a bit depth of a display coupled to the display pipe. Thus, component compatibility may be a desirable factor to consider and compensate for before image data is lost to data truncation (e.g., an image data truncation, truncation operations) caused by a bit depth reduction between the display pipe and the display. The image data may be truncated by the bit depth reduction during transmission from the display pipe to the display (or a receiving component of the display, such as a display driver or a terminal), during processing and/or driving of the image data performed by the display and/or components of the display, or the like. This present disclosure describes below the data truncation that may happen during transmission from the display pipe to the display, however it should be understood that the systems and methods described herein should not be limited to that data truncation and may be useful in a variety of data truncation scenarios.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
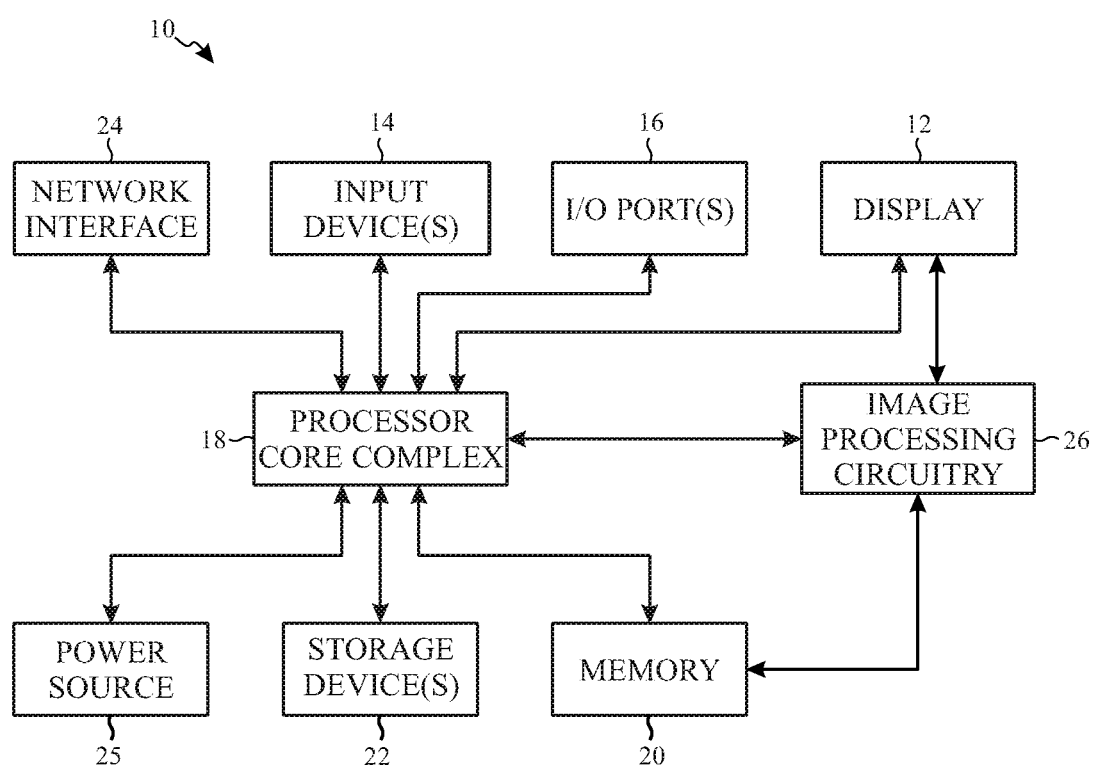
FIG. 1 is a block diagram of an electronic device used to display image frames, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to electronic displays and, more particularly, to the compression of data and use thereof in rendering images on the electronic displays. Numerous electronic devices are coupled to and/or include electronic displays to display images that provide visual representations of information. Such electronic devices may include computers, mobile phones, portable media devices, tablets, televisions, watches, virtual-reality headsets, and vehicle dashboards, among many others. The display may provide an interface (e.g., a visual and/or a visual and tactile interface) that may permit for user interaction with the electronic device.

During operation, the images presented on the electronic display may be relatively dynamic (e.g., frequently changing) or relatively static (e.g., change infrequently). For example, a home screen, a representation of a page of a book or a website, a picture being displayed, or the like, may use relatively few (or even no) changes in the generated image displayed over a period of time (e.g., for multiple generated image frames). However, if the electronic device and/or the display generate images in a similar manner, regardless of the static or dynamic properties of the image to be generated (e.g., whether the image is to change from one frame to the next), excess processing, power usage, or the like may be unnecessarily exerted.

The present disclosure generally relates to electronic displays, which may be used to present visual representations of information, for example, as one or more images. Redundant (e.g., non-changing, substantially similar) image frames may provide an opportunity to reduce power consumption and/or reduce processing of an image frame for presentation on a display. For example, compression of image frames while a display is idle (e.g., non-changing image frames) may be provided. However, to ensure that the power saving and/or processing saving advantages of the compression, as well as benefits related to reduced space requirements for storage of the compressed image data, do not come with a loss of image quality, it may be advantageous to implement lossless compression techniques to the compression of the image frame. The techniques outlined herein have the advantage of being lossless (thus, maintaining the same level of visual accuracy as if non-compressed image data were used as a source image), and may be combined with selective power-gating. For example, a display pipe may generate one or more frames of images and/or video sequences for presentation on a display, and thus may be combined with techniques described herein to attain lossless image compression and reduced power consumption of the electronic device during presentation of redundant image frames in a replay mode. While in the replay mode, components of the display pipe may be selectively power-gated (e.g., meaning, a decrease of power supplied to the component and/or the component being removed from a power source, where the component is operated in a reduced-power state). Selectively power-gating one or more components of the display pipe may reduce power consumed by the display pipe, and thus the electronic device as a whole because less power is being consumed by the components uninvolved with replaying of an image frame (e.g., presentation of redundant image frames).

Furthermore, in some systems, a bit depth of one or more components of image processing circuitry (e.g., a display pipe) may be larger than a bit depth of one or more components of the display used when presenting an image via the display (e.g., a display driver). In these situations, image data may be truncated, or lost, when transmitted from the image processing circuitry to the display. Accordingly, the techniques outlined herein may describe image processing circuitry, such as a display pipe, that include a dither block to compensate for the bit depth reduction between the image processing circuitry and the display.

The dither block may compress image data before transmission to the display. The dither block may compress the image data by an amount programmable based on the bit depth of the display (or a difference between the bit depth of the image processing circuitry and the bit depth of the display). This compression of the image data may generate compressed image data having a total data length equal to the bit depth of the display. After compression of the image data, the dither block may append buffer data (e.g., zeros or data included independent of the frame image data used in presentation of the image on the display) to the compressed image data to return a total data length to equal the bit depth of the image processing circuitry. In this way, when the compressed image data (e.g., compressed image data and appended zero data) is transmitted to the display from the image processing circuitry, any truncation that occurs merely removes the buffer data (e.g., appended buffer data) without altering the compressed image data.

In image processing circuitry (e.g., display pipes) that may operate in a replay mode, image data may transmit through the image processing circuitry such that a dither block of the image processing circuitry processes the image data before being compressed for a frame replay (e.g., while in a replay mode). When compressing the compressed image data (e.g., to generate twice-compressed image data) for storage, less memory may be used to store the twice-compressed image data (e.g., compressed once by the dither block and compressed again by the compressor) than may be used to store image data compressed once via the compressor.

To help illustrate, an electronic device 10 including a display 12 is shown in FIG. 1. As is described in more detail below, the electronic device 10 may be any suitable electronic device, such as a computer, a mobile phone, a handheld electronic device, a tablet electronic device, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the display 12, one or more input devices 14, one or more input/output (I/O) port(s) 16, a processor core complex 18 having one or more processor(s) or processor cores, local memory 20, one or more memory storage device(s) 22, a network interface 24, a power source 25 (e.g., power supply), and image processing circuitry 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the memory storage device 22 may be included in a single component. Additionally or alternatively, the image processing circuitry 26 (e.g., a graphics processing unit, display pipe) may be included in the processor core complex 18.

As depicted, the processor core complex 18 is operably coupled with local memory 20 and the memory storage devices 22. Thus, the processor core complex 18 may execute instruction stored in local memory 20 and/or the memory storage devices 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the memory storage devices 22 may store data used in processing by the processor core complex 18. Thus, in some embodiments, the local memory 20 and/or the memory storage devices 22 may include one or more tangible, non-transitory, computer-readable mediums. For example, the local memory 20 may include random access memory (RAM) and the memory storage devices 22 may include read only memory (ROM), rewritable non-volatile memory such as flash memory, hard drives, optical discs, and/or the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network.

Additionally, as depicted, the processor core complex 18 is operably coupled to the power source 25. In some embodiments, the power source 25 may provide electrical power to one or more components in the electronic device 10, such as the processor core complex 18 and/or the display 12. Thus, the power source 25 may include any suitable source of energy, such as a rechargeable lithium polymer (Li-poly) battery and/or an alternating current (AC) power converter.

Furthermore, as depicted, the processor core complex 18 is operably coupled with the one or more I/O ports 16. In some embodiments, I/O ports 16 may enable the electronic device 10 to interface with other electronic devices. For example, when a portable storage device is connected, the I/O ports 16 may enable the processor core complex 18 to communicate data with the portable storage device.

As depicted, the electronic device 10 is also operably coupled with the one or more input devices 14. In some embodiments, an input device 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the display 12. In such embodiments, the touch sensing components may receive user inputs by detecting occurrence and/or position of an object touching the surface of the display 12.

In addition to enabling user inputs, the display 12 may include a display panel with one or more display pixels. Additionally, each display pixel may include one or more sub-pixels, which each control luminance of one color component (e.g., red, blue, or green). As described above, the display 12 may control light emission from the display pixels (e.g., luminance) to present visual representations of information, such as a graphical user interface (GUI) of an operating system, an application interface, a still image, or video content, by displaying frames based at least in part on corresponding image data. As depicted, the display 12 is operably coupled to the processor core complex 18 and the image processing circuitry 26. In this manner, the display 12 may display image frames based at least in part on image data generated by the processor core complex 18, the image processing circuitry 26. Additionally or alternatively, the display 12 may display image frames based at least in part on image data received via the network interface 24, an input device 14, an I/O port 16, or the like.

Figure 2:
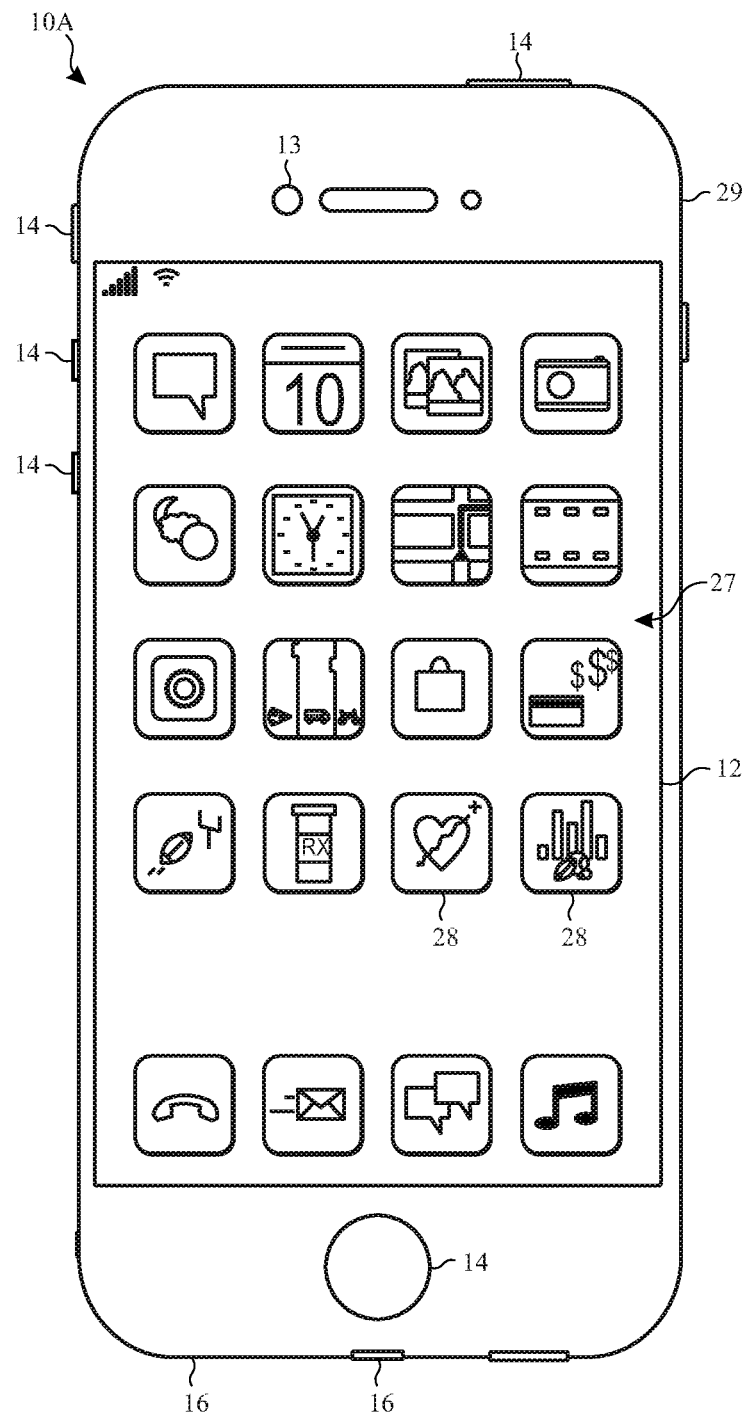
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

In the depicted embodiment, the display 12 is displaying a graphical user interface (GUI) 27 having an array of icons 28. By way of example, when an icon 28 is selected either by an input device 14 or a touch-sensing component of the display 12, an application program may launch. As depicted, the handheld device 10A includes an enclosure 29 (e.g., housing). In some embodiments, the enclosure 29 may protect interior components from physical damage and/or shield them from electromagnetic interference. Additionally, as depicted, the enclosure 29 may surround the display 12.

Furthermore, as depicted, input devices 14 may be accessed through openings in the enclosure 29. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 may be accessed through openings in the enclosure 29. In some embodiments, the I/O ports 16 may include, for example, an audio jack to connect to external devices.

Figure 3:
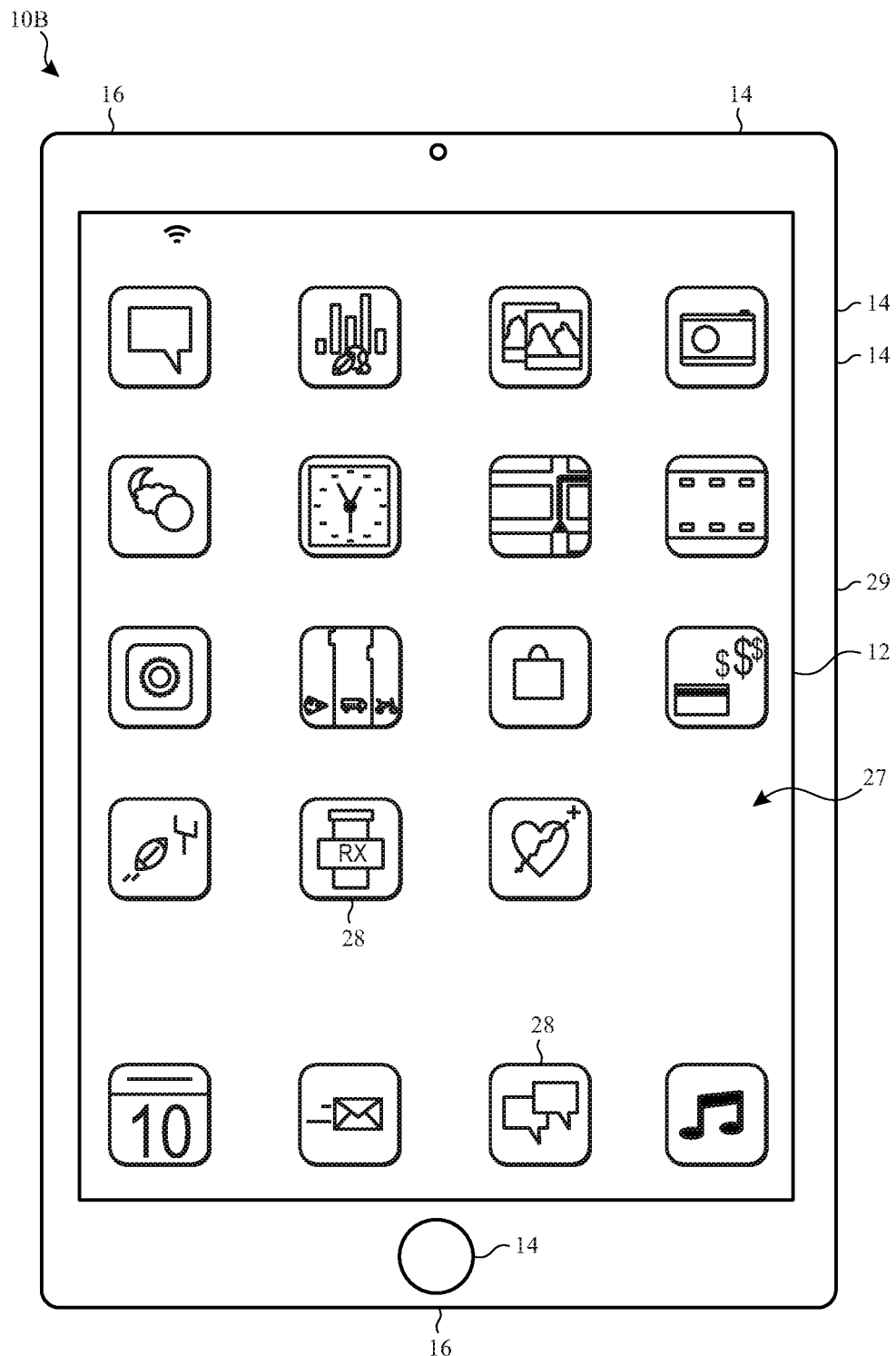
FIG. 3 is an example of the electronic device of FIG. 1, in accordance with an embodiment.
Figure 4:
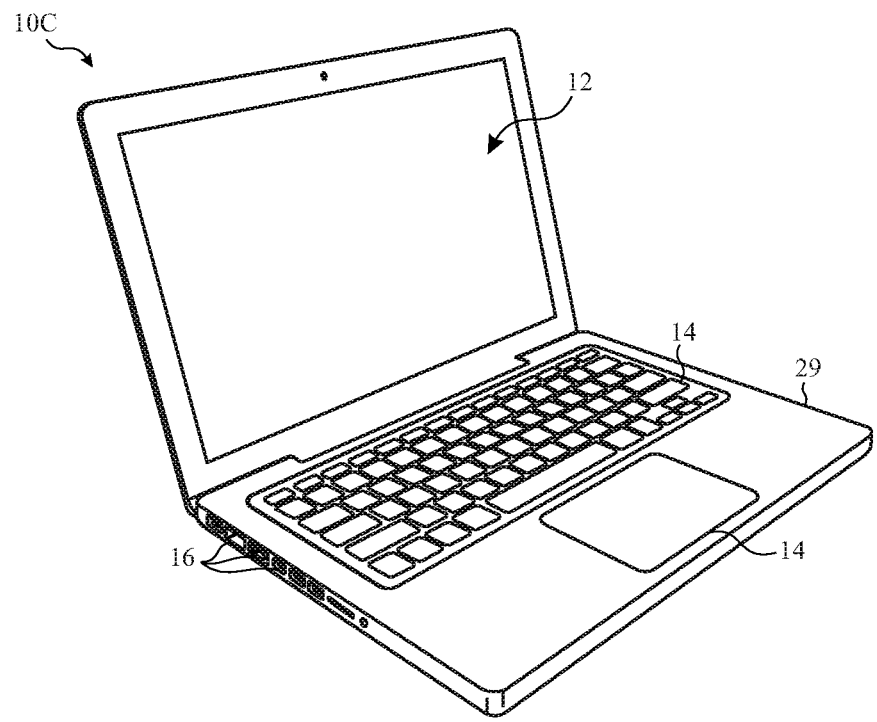
FIG. 4 is an example of the electronic device of FIG. 1, in accordance with an embodiment.
Figure 5:
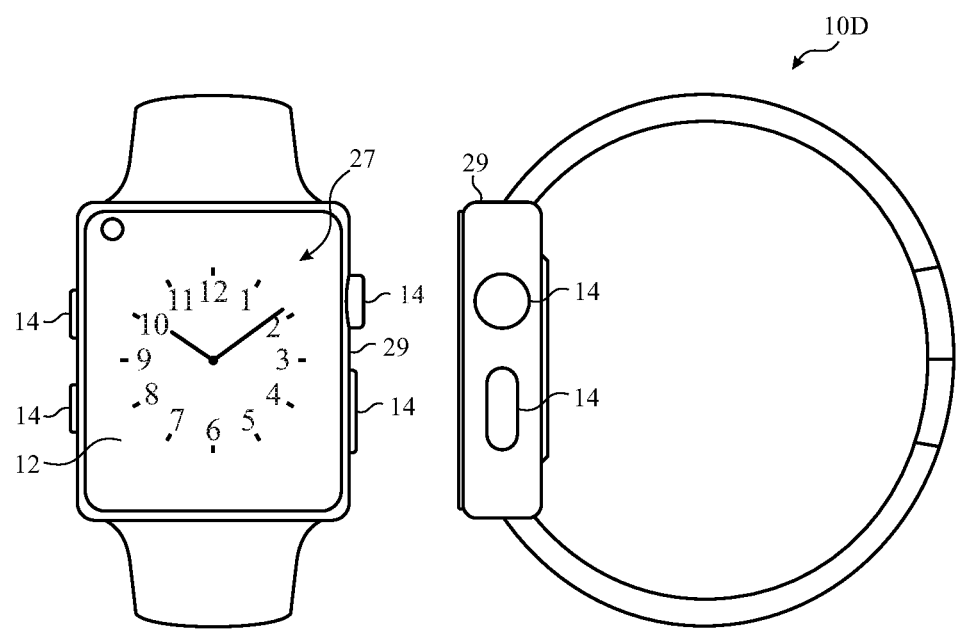
FIG. 5 is an example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an display 12, input devices 14, I/O ports 16, and an enclosure 29.

Figure 6:
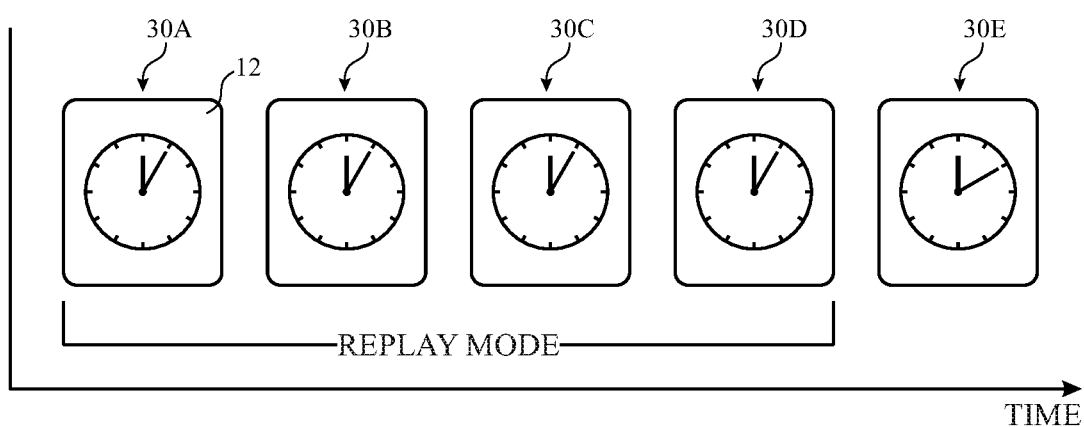
FIG. 6 is an illustration of a display of the electronic device of FIG. 1 presenting an image using a replay mode, in accordance with an embodiment.

As described above, the electronic device 10 may display one or more image frames. For example, FIG. 6 illustrates an example display 12 presenting one or more image frames over time. However, sometimes the one or more image frames that the electronic device 10 is to display may repeat once, twice, three-times, or more during a displaying time period (e.g., repeating image 30A frames displaying a static image). While the image frames are repeated, a portion of the electronic device 10 may be operated in a replay mode. As described above, while in replay mode, the electronic device 10 may not repeat processing of the image data for the repeated image frame, and may instead retrieve already-processed image data from memory 20 and/or memory storage devices 22 for use in presentation of the repeated image frame. Furthermore, while in the replay mode, portions of the electronic device 10 not used in retrieval of the already-processed image data may be power-gated to reduce power consumption of the electronic device 10. For example, a portion responsible for processing of image data (e.g., such as processing to generate processed image data) of the image processing circuitry 26 may be power-gated during the replay mode. This may be permitted because the image data used during the replay mode has already been processed before entering the replay mode.

The electronic device 10 may remain in the replay mode until an exit condition is met and/or detected by the processor core complex 18 and/or image processing circuitry 26. An example of an exit condition may be receiving a notification of a new image frame and/or detection of new image data (e.g., changing image, different image data) being transmitted to the image processing circuitry 26. Upon exit from the replay mode, the electronic device 10 may present a new image frame via the display 12 (e.g., represented by new image 30B frame).

Figure 7A:
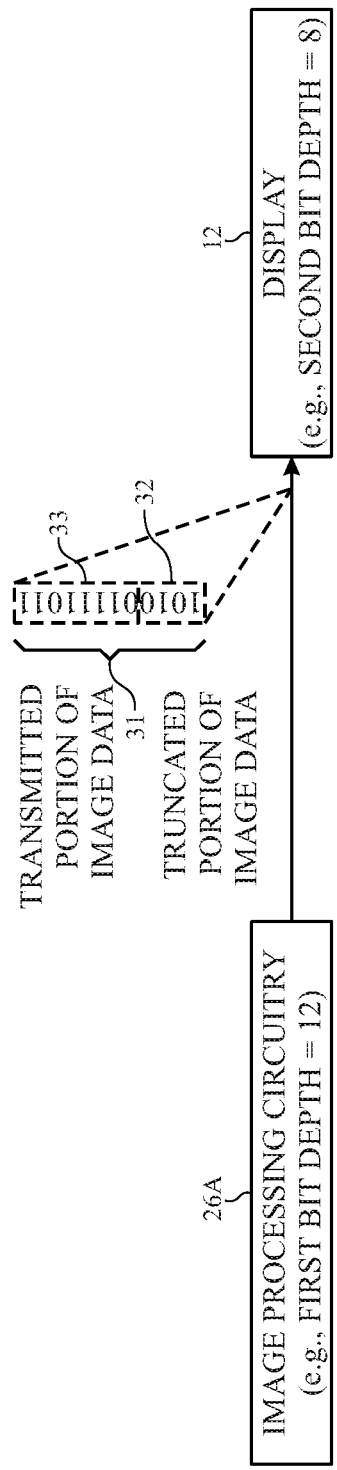
FIG. 7A is an illustration of the display of the electronic device of FIG. 1 receiving truncated image data from a first example of image processing circuitry of the electronic device of FIG. 1 operating without considerations for bit depth reductions between the display and the image processing circuitry, in accordance with an embodiment.
Figure 7B:
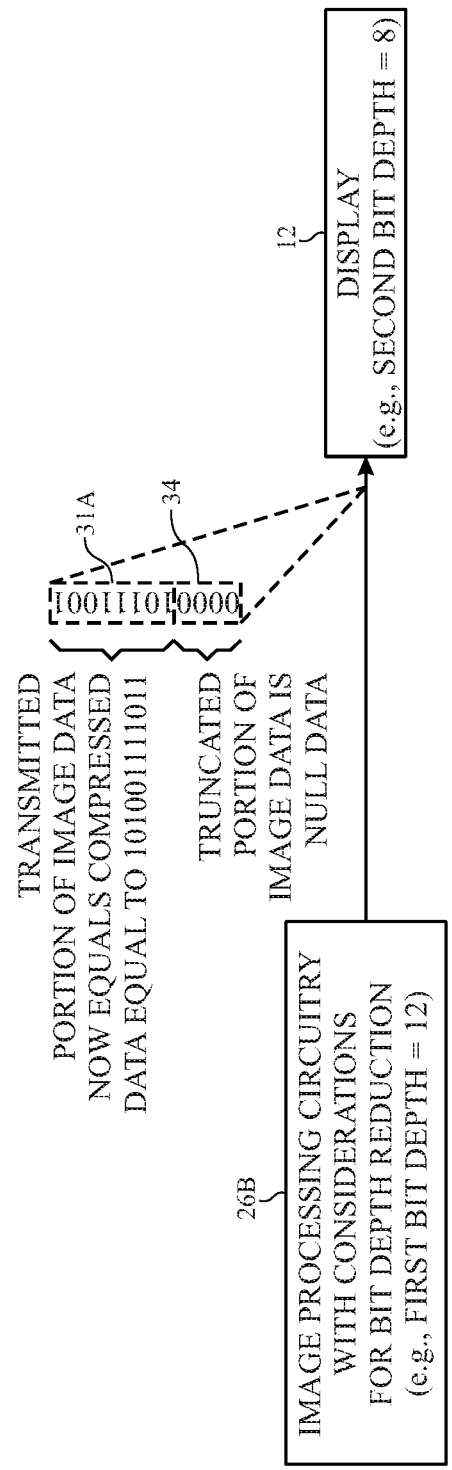
FIG. 7B is an illustration of the display of the electronic device of FIG. 1 receiving image data from a second example of image processing circuitry of the electronic device of FIG. 1 operating with considerations for bit depth reductions between the display and the image processing circuitry, in accordance with an embodiment.

In some examples, the display 12 and the image processing circuitry 26 do not have a same bit depth. To elaborate, FIG. 7A illustrates the display 12 receiving image data 31 from a first example of image processing circuitry 26A. However, when the image processing circuitry 26 has a larger bit depth than the display 12, the image data 31 received by the display 12 is truncated during the transmission (e.g., such that a truncated portion 32 of the image data is lost during the transmission and a transmitted portion 33 of the image data is received by the display 12). The image processing circuitry 26A may operate without consideration for the bit depth reduction between the display 12 and the image processing circuitry 26 (e.g., 26A in FIG. 7A). For ease of discussion, FIG. 7A is discussed in parallel with FIG. 7B. FIG. 7B illustrates the display 12 receiving image data from a second example of image processing circuitry 26B. The image processing circuitry 26B may operate with consideration for the bit depth reduction between the display 12 and the image processing circuitry 26 (e.g., 26B in FIG. 7B).

The image processing circuitry 26A that does not operate with consideration for the bit depth reduction may lose at least a portion of the image data 31 when data is truncated during transmission between the display 12 and the image processing circuitry 26A (e.g., loses truncated portion 32. The display 12 may thus display an incorrect and/or incomplete image based on just the transmitted portion 33 of the image data 31. However, image transmission operations may improve when operating the image processing circuitry 26 with consideration for the bit depth reduction. For example, the image processing circuitry 26B operates with consideration for the bit depth reduction, such as by using a dither block. The image processing circuitry 26B may use the dither block to compress image data 31 to compressed image data 31A and to append buffer data 34 to the compressed image data 31A. In this way, the image processing circuitry 26B does not lose any portion of the image data 31 to data truncation caused by the bit depth reduction. The buffer data 34 may be appended to a most significant bit and/or to a least significant bit of the compressed image data 31A based on an alignments of bits during the transmission. In some cases, a bit depth expansions may be performed to increase a bit depth of a data packet including the compressed image data 31A. The bit depth expansion may result in the data packet including both compressed image data 31A and buffer data 34 that was generally appended to the compressed image data.

In examples where the dither block is combined with compression operations to operate the electronic device 10 in a replay mode, the image data may be compressed via the dither block and then compressed via a compressing block (e.g., a compressor) for future retrieval from memory as part of the replay mode. Furthermore, the dither block and compressing blocks may be implemented within a display pipe. The display pipe may process image data being used to display an image. For example, the display pipe may process the image data to convert the image data from a source format into a display format.

Figure 8:
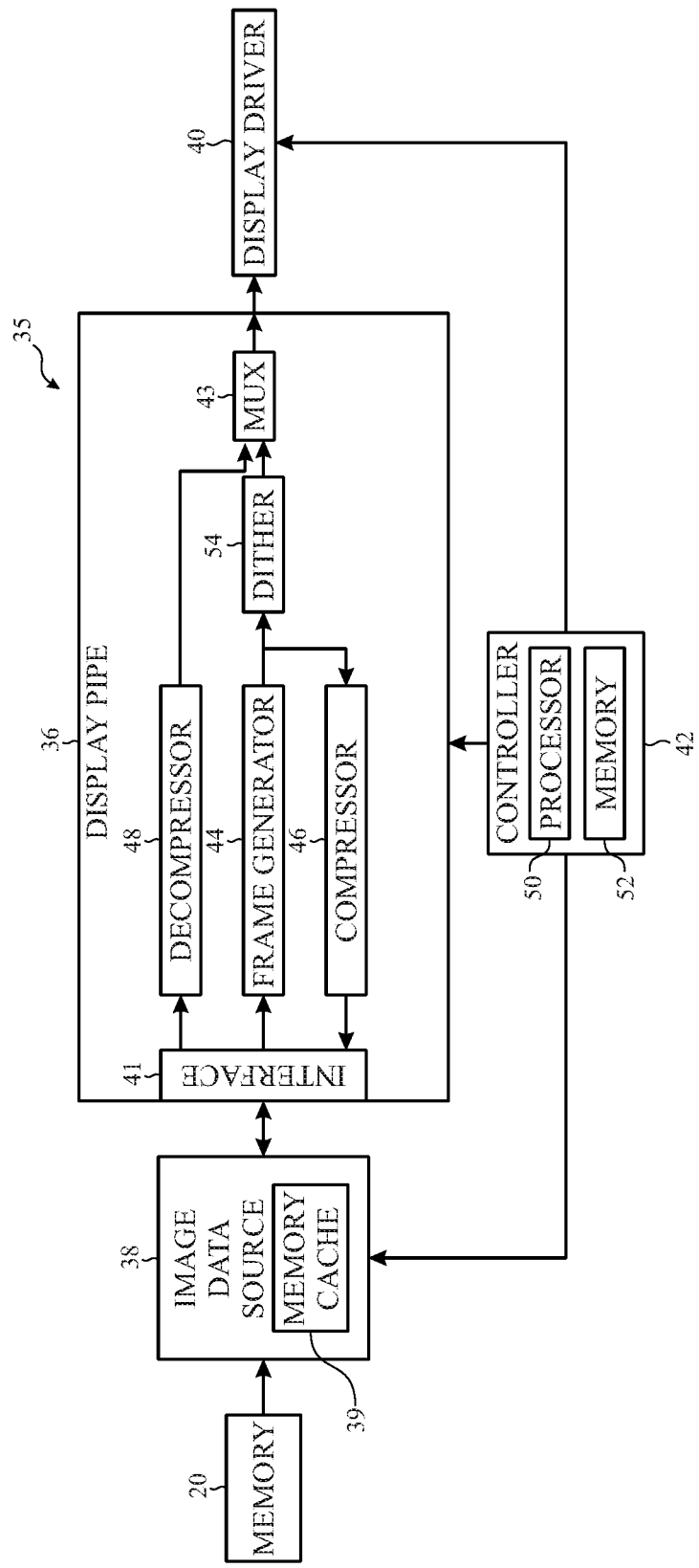
FIG. 8 is a block diagram of a display pipe as an example of the image processing circuitry of the electronic device of FIG. 1 operating with considerations for bit depth reductions between a display and the image processing circuitry, in accordance with an embodiment.

To help elaborate, FIG. 8 illustrates a block diagram of a portion 35 of the electronic device 10 including a display pipe 36 (sometimes referred to as a "display pipeline"). The display pipe 36 may be implemented by any suitable combination of circuitry in the electronic device 10. For example, the display pipe 36 may be included in the processor core complex 18, the image processing circuitry 26, or any combination thereof.

As depicted, the portion 35 of the electronic device 10 also includes an image data source 38, a display driver 40, and a controller 42. The controller 42 may control operation of the display pipe 36, the image data source 38, and/or the display driver 40. The controller 42 may include a controller processor 50 and controller memory 52 to control the display pipe 36. The controller processor 50 may execute instructions stored in the controller memory 52. The controller processor 50 may be included in the processor core complex 18, the image processing circuitry 26, a timing controller in the display 12, a separate processing module, or any combination thereof. The electronic device 10 may include the controller memory 52, at least in part, in the local memory 20, the memory storage devices 22, a separate tangible, non-transitory, computer readable medium, or any combination thereof.

The display pipe 36 is communicatively coupled to an image data source 38. In some embodiments, the image data source 38 may be, for example, a memory controller inclusive of a memory cache 39. The electronic device 10 may include the image data source 38, at least in part, in the processor core complex 18, the image processing circuitry 26, or a combination thereof. The memory cache 39 may store data received by the image data source 38. The image data source 38 may use data stored in the memory cache 39 instead of accessing data from memory 20 and/or memory 52. This may reduce power consumption and/or increase the speed of responses to access of the data stored in the memory cache 39.

The image data source 38 may be coupled to memory 20, which may include one or source image buffers. The image data source 38 may receive the data from the one or more source image buffers and transmit the received data to the display pipe 36 for generation of an image frame for presentation on the display 12 via display driver 40. It should be noted that other arrangements of the image data source 38 and the memory 20 may be suitable and may use systems and methods described herein. For example, the image data source 38 may couple to the display pipe 36 through the memory 20 and the display pipe 36 may include a fetch block to interface with the memory 20, such as to retrieve pre-rendered image data. Further details regarding this arrangement and other descriptions of a display pipe embodiment may be found in co-pending, commonly-assigned, U.S. patent application Ser. No. 16/123,848, which is hereby incorporated by reference herein in its entirety.

The controller 42 via at least the controller processor 50 may determine whether an image being displayed on the display 12 is changing. When the controller 42 determines that an image being displayed on the display 12 is changing, the image frame that is generated may not be saved for use in a replay mode. However, if the controller 42 determines successive image frames are unchanged, and an image presented is static, the display pipe 36 may compress the image data of the current image frame and store the compressed image data to the image data source 38 (e.g., for storage therein in the memory cache 39 and/or for transmission to memory 20 and/or controller memory 52).

In some embodiments, storing the compressed image data in a compressed image buffer in the memory cache 39 (or, for example, in memory 20 or controller memory 52) may permit a second source of data to generate an image frame for display on the display 12. For example, the compressed image data may include a portion of a generated image that is constant such that image data that is constant over multiple frames may be sourced from the compressed image buffer. In this way, corresponding portions of the generated image that change over multiple frames may be sourced from an image buffer in, for example, memory cache 39, memory 20, and/or controller memory 52, and not from the compressed image buffer.

When the controller 42 determines that generated images are changing, (or when the controller 42 does not detect generation of successive unchanged images), the display pipe 36 may receive image data from one or more image buffers in the memory 20, controller memory 52, and/or memory cache 39 via an interface 41 and generate an output frame based on the received image data. The display pipe 36 may generate the output frame (e.g., image frame) based upon data stored in a particular image buffer or based upon data stored across more than one image buffer. The received image data may be processed by a frame generator 44 of the display pipe 36, which may include one or more blocks to perform manipulation (e.g., processing, compositing) of the data, conversion of the data from source data to display data, a sub-pixel layout resampler (SPLR), a gain block, an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a sub-pixel uniformity compensation (SPUC) block, a content frame dependent duration (CDFD) block, an ambient light sensing (ALS) block, or any combination thereof.

After processing, the display pipe 36 may output processed image data, such as display pixel image data, to the display driver 40 via a multiplexer 43. Based at least in part on the processed image data, the display driver 40 may apply analog electrical signals to the display pixels of the display 12 to display images as a generated image frame. In this manner, the display pipe 36 may facilitate providing visual representations of information on the display 12.

The aforementioned process may continue as the image frames are changing. However, the display pipe 36 and/or the controller 42 may monitor the generated image frames for changes in content (e.g., to determine if the content of successive frames is static). Identification of static content in generated frames may correspond to two, three, four, five, etc. successive frames in which the content of the frames does not change. When it is determined that generated frames are static (e.g., a threshold number of successive frames have been generated), a generated frame may, in addition to being sent to the display driver 40 via the multiplexer 43, be transmitted to compressor 46 while the display pipe 36 operates in a replay mode (e.g., a frame replay or repeating operational mode). The compressor 46 may compress the generated frame and write back the compressed frame to a compressed image buffer (e.g., located in memory cache 39, memory 20, and/or controller memory 52) via the interface 41. As described herein, the threshold number is presumed as equal to two frames, however as noted above this may change to be any suitable threshold number in other examples and/or in an actual implementation.

The display pipe 36 may read from the compressed image buffer as long as static image conditions exist (e.g., until data at one or more image buffers is detected as being changed, until one or more source addresses used to identify the one or more image buffers is detected as being changed, or the like is detected), and thus as long as the controller 42 operates the display pipe 36 in the replay mode. The data stored in the compressed image buffer may be transmitted to the display pipe 36 during the static condition as source data and may be decompressed by decompressor 48, which may operate to perform an opposite set of steps as those performed in the compressor 46 on the received compressed image buffer data to generate an image frame for transmission to the display driver 40 via the multiplexer 43 (which, for example, may be controlled in conjunction with the monitoring of the static condition of images rendered). Use of the compressor 46 and the decompressor 48 as described above may enable operating one or more portions of the display pipe 36 (e.g., the frame generator 44) in a low power consumption state (e.g., sleep mode, reducing a power supplied to the one or more portions, temporarily eliminating a power supplied to the one or more portions) while the display pipe 36 is operating in the replay mode to reduce power consumption and/or processing overhead of the electronic device 10.

As described above, the display pipe 36 may include a dither block 54 responsible for performing dithering operations on the image data (e.g., dither block compression and appending of buffer data) before using the image data to present an image via the display 12. In embodiments that include the compressor 46 and/or the decompressor 48, the dither block 54 may process the image data before the image data is sent to the compressor 46 for storage into the compressed image buffer (e.g., located in memory cache 39, memory 20, and/or controller memory 52). The controller 42 may determine whether a bit depth reduction occurs between the display pipe 36 and the display 12 (e.g., display 12 and/or display driver 40). In response to determining that a bit depth reduction occurs, the controller 42 may instruct the dither block 54 to compensate for the bit depth reduction. In this way, the controller 42 may transmit to the dither block 54 a bit depth of the display 12. The dither block 54 may process image data based at least in part on the bit depth. The controller 42 may program the dither block 54 (and/or instruct the display pipe 36 to program the dither block 54) based on the bit depth of the display 12. The programming of the dither block 54 may be performed by the controller 42 at a start-up or power on of the display pipe 36 (e.g., such as during a display pipe 36 configuration or initialization). The controller 42 and/or the display pipe 36 may receive a signal from the display 12 (or the display driver 40) indicative of the bit depth of the display 12. In this way, the dither block 54 may be programmed in response to receiving an indication of its bit depth from the display 12. The dither block 54 may compress the image data into a bit depth of the display 12 and may append the buffer data to the compressed image data to increase an overall length of the image data back to the bit depth of the display pipe 36. The dithering operations enable the buffer data to be truncated between the display pipe 36 and the display 12 without the image data being lost to truncation since the actual image data has been compressed into the bit depth of the display 12 and is thus not susceptible to the data truncation.

Figure 9:
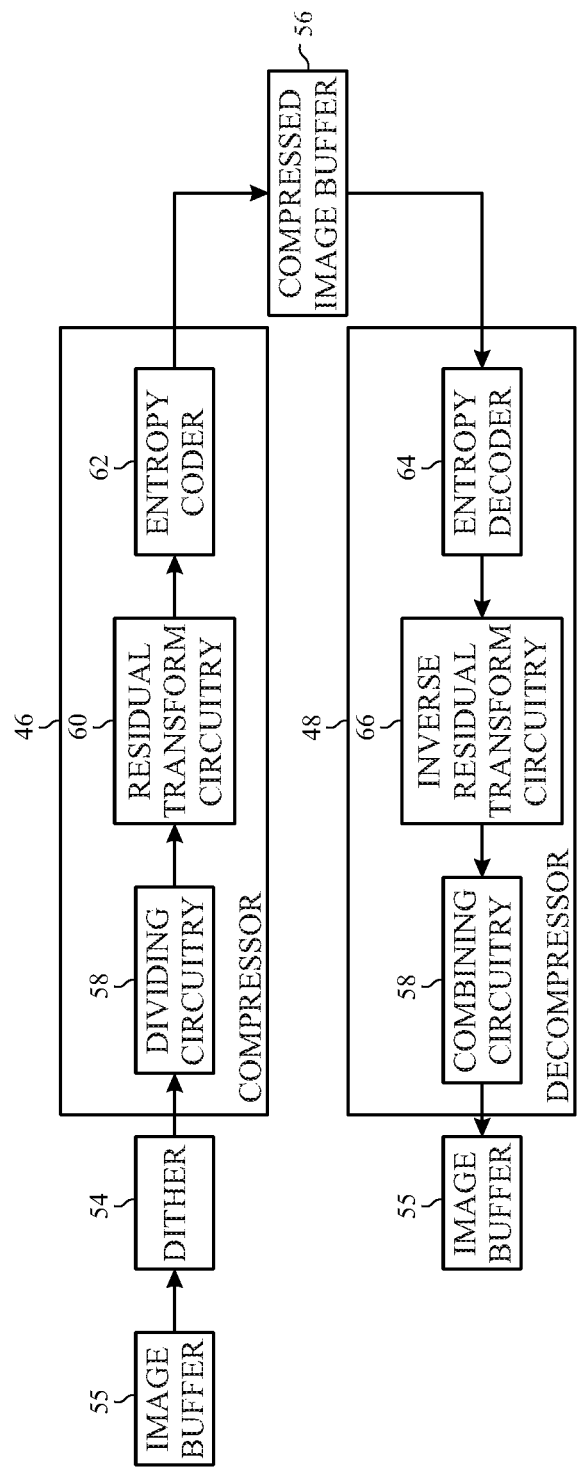
FIG. 9 is a block diagram of a compressor and a decompressor of the display pipe of FIG. 8, in accordance with an embodiment.

To help elaborate on the compensations for the bit depth reduction and the compression/decompression operations, FIG. 9 illustrates an example of the dither block 54, the compressor 46, and the decompressor 48 that may be used in generation of image data that is transmitted to display driver 40. As illustrated, the dither block 54 may couple between the compressor 46 and an image buffer 55, which may represent an image buffer 55 read into the display pipe 36 via interface 41 from the memory cache 39, the memory 20, and/or the controller memory 52. Not illustrated for simplicity is the frame generator 44 or any of the processing therein. It may be appreciated that the dither block 54 and the compressor 46 may operate on image data received from the image buffer 55 and processed by the frame generator 44.

As described above, once the controller 42 determines that the image to be displayed on the display 12 is a static image, compression of the image data received by the data pipe 36 and processed by the frame generator 44 may occur via the compressor 46. The compressor 46 may generate a compressed image for storage in a compressed image buffer 56. The compressed image buffer 56 may be located in memory cache 39, memory 20, and/or controller memory 52, and may be used an alternate image source for the display pipe 36 when static images are detected.

In some embodiments, the compressor 46 and the decompressor 48 are each a portion of an image memory compressor (IMC). The purpose of the IMC is to losslessly compress the image data from an image buffer 55 (e.g., after processing by the frame generator 44), which also has the advantage of reduction in the memory footprint of the system and/or reduction in the memory bandwidth of the system utilized. As previously noted, the IMC may operate to losslessly compress (e.g., via the compressor 46) image data, while the decompressor 48 is used to losslessly decompress data retrieved and/or received from the compressed image buffer 56 (located in memory cache 39, memory 20, and/or controller memory 52). To compress the image, the compressor may divide the image into image portions of predetermined sizes (e.g., 128-pixel sets) via dividing circuitry 58. Each image portion may be sent through residual transform circuitry 60 followed by an entropy coder 62. The decompressor 48 includes an entropy decoder 64 followed by inverse residual transform circuitry 66 that may perform the reverse set of the residual transform operations of the compressor 46 (e.g., residual transform circuitry 60).

The compressor 46 may operate to losslessly compress the data from the image buffer 55. To do so, image data from the image buffer 55 may transmit through dividing circuitry 58. The dividing circuitry 58 may divide the image data into image portions. Each image portion may transmit through the residual transform circuitry 60. The residual transform performed by the residual transform circuitry 60 may de-correlate pixels within a respective image portion being compressed.

The residual transform may include subtracting each data point of the image portion (e.g., value[i]) from the value before it (e.g., value[i]-value[i−1]), and in cases where there is no value before the data point (e.g., for the first data point of the array of data points), a configurable value may be used for that data point. These residual values may be calculated for each value in the array and may be used to generate coefficients. The coefficients may be passed to the entropy coder 62 after undergoing signed-magnitude encoding to replace the coefficients (e.g., positive or negative values) with positive coefficients, permitting positive values (e.g., positive values corresponding to negative coefficients and positive values corresponding to positive coefficients) to undergo the compression.

The residual transform circuitry 60 may transmit the data resulting from the residual transform onto the entropy coder 62. The entropy coder 62 may perform the actual compression of the image data. The entropy coder 62 may work on a subset of coefficients (e.g., 2, 3, 4, or any suitable amount of coefficients) in two stages. A subset of coefficients may be passed through a zero group coder to remove sequential runs of zero data (e.g., 0, or other value indicated as a zero and/or null value). Any remaining non-zero data may be packed using one or more codes representing the non-zero data. In some embodiments, the zero group coder may "look ahead" a cycle and modify coefficients in flight (e.g., before officially transmitting to the zero group coder), which may improve latencies of encoding operations.

The decompressor 48 may perform the operations of the compressor 46 but in reverse. In this way, the entropy decoder 64 may perform operations of the entropy coder 62 in reverse. That is, the entropy decoder 64 may match the codes to the non-zero data and then operate to return zero data to the array of coefficients. The inverse residual transform circuitry 66 may perform reverse operations of the residual transform circuitry 60. In particular, the inverse residual transform circuitry 66 may return the coefficients to signed values and then transform the residuals represented by the coefficients back into the image portion of image data.

The decompressor 48 may recombine the image portions into the image data via combining circuitry 58.

The compressor 46 and the decompressor 48 may perform the compressing and decompressing operations on compressed image data output from the dither block 54. The dither block 54 may compress image data in response to the controller 42 determining that the display 12 (e.g., at least a portion of the circuitry corresponding to the display 12) uses a bit depth less than a bit depth used by the display pipe 36. For example, the dither block 54 may compress image data from a first bit depth (e.g., first length) down to a second bit depth (e.g., second length). The dither block 54 may also append buffer data to the compressed image data to permit the display pipe 36 to continue to process and/or transmit the compressed image data via display pipe 36 infrastructure (e.g., circuitry, hardwiring, and/or software protocols that reference the bit depth of the display pipe 36). It is noted that the term "bit depth" corresponds to the bit depth of the display 12 and/or the bit depth of the display pipe 36, but in some examples may also correspond to a bit depth of a most strict component of the display 12 and/or the display pipe 36. For example, a display driver 40 associated with the display 12 may have a smaller bit depth than the display 12 so the smaller bit depth is considered the bit depth of the display driver 40 (since that is where the electronic device 10 may be susceptible to image data truncation).

The buffer data may have a length (e.g., data length) equal to a difference between the bit depths of the display pipe 36 and of the display 12. Buffer data may be of any value suitable for the electronic device 10 system within which the systems and methods described herein are used. For example, the buffer data may include zero data, null data, and/or zero values. In any case, the buffer data is data that may be lost during the transmission between the display pipe 36 and the display 12. The buffer data may be appended to an end or a beginning of the compressed image data based at least in part on a bit aligned of the particular electronic device and how data is interpreted at the display 12, as described earlier with respect to FIGS. 7A and 7B. For example, the buffer data may be appended to a beginning of the compressed image data (e.g., may not be appended to an end of the compressed image data) when the data is aligned to the least significant bit in the particular electronic device.

Figure 10:
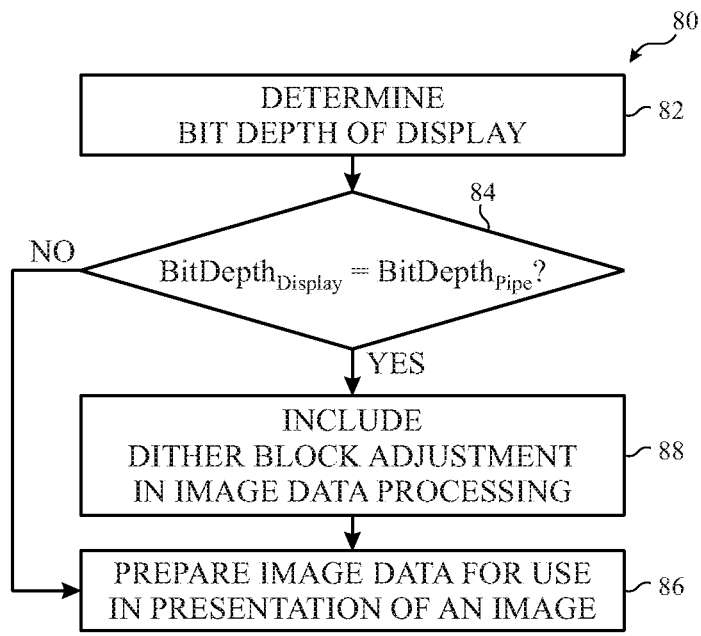
FIG. 10 is a functional diagram of determining whether to process image data with consideration for bit depth reductions, in accordance with an embodiment.

The dither block 54 may be operated selectively by the controller 42 in response to a determination that the bit depths between the display pipe 36 and the display 12 are unequal (e.g., not equal). To elaborate, FIG. 10 is a functional diagram of a method 80 used when determining whether to process image data with consideration for bit depth reductions. Although the method 80 is described below as performed by the controller 42, it should be noted that the method 80 may be performed by any suitable processor or any other suitable component, such as by a portion or circuitry of the display pipe 36. Moreover, although the following description of the method 80 is described in a particular order, it should be noted that the method 80 may be performed in any suitable order.

At block 82, the controller 42 may determine a bit depth of the display 12. At power-on, the controller 42 may receive data from the display 12 that indicates the bit depth of the display 12. In some embodiments, the bit depth of the display 12 may be a value that is programmed into the controller 42. Furthermore, in some embodiments, the controller 42 may perform a polling operation that retrieves data from the display 12 that indicates the bit depth of the display 12.

Upon determining the bit depth of the display 12, at block 84, the controller 42 may determine whether the bit depth of the display 12 equals the bit depth of the display pipe 36 (e.g., $\text{BitDepth}_{Display}=\text{BitDepth}_{Pipe}$). When the bit depths are not equal, data transmitted from the display pipe 36 to the display 12 may be truncated. This may happen since hardware and/or software of the display 12 may be unsuitable for processing data having a length equaling (e.g., compatible with) the bit depth of the display pipe 36. For example, a wired connection within the display pipe 36 may be suitable for a bit depth equal to or less than 12 bits but a wired connection within the display 12 may be suitable for a bit depth equal to or less than 8 bits, thus when data having a length of 12 bits is transmitted from the display pipe 36 to the display 12, 4 bits (e.g., 12 bits−8 bits=4 bits) of data is lost to data truncation caused by the bit depth reduction between the components.

In response to the controller 42 determining that the bit depth of the display 12 equals the bit depth of the display pipe 36, the controller 42 may proceed, at block 86, to prepare image data for use in presentation of an image frame without compensating for a bit depth reduction. That is, the controller 42 may operate the display pipe 36 to retrieve image data from the image data source 38, process the image data via the frame generator 44, pass the image data through the dither block 54 without compressing the image data, and proceed either to save the image data to the memory 20, the controller memory 52, and/or the memory cache 39 after processing via the compressor 46 and/or to send the image data to the display driver 40 for use in presentation of the image frame.

However, in response to the controller 42 determining that the bit depth of the display 12 is not equal to the bit depth of the display pipe 36, the controller 42 may proceed, at block 88, to include a dither block adjustment in the image data processing performed via the display pipe 36. In this way, the image data retrieved by the display pipe 36 may undergo compression via the dither block 54 before transmission to the compressor 46 and/or before transmission to the display driver 40. The controller 42 may operate the dither block 54 to compress image data having a first bit depth (e.g., a bit depth equal to the bit depth of the display pipe 36) into image data having a second bit depth less than the first bit depth (e.g., a bit depth equal to the bit depth of the display 12). When image data is compressed to the second bit depth, truncation of image data may be avoided and lossless image presentation may be achieved. Upon compression of the image data, at block 86, the controller 42 may operate the display pipe 36 to prepare image data for use in presentation of an image frame (e.g., with compensation for a bit depth reduction). That is, the controller 42 may operate the display pipe 36 to retrieve image data from the image data source 38, process the image data via the frame generator 44, pass the image data through the dither block 54 for compression into the second bit depth, and proceed to either save the image data to memory after processing through the compressor 46 and/or send the image data to the display driver 40 for presentation of the image frame.

Figure 11:
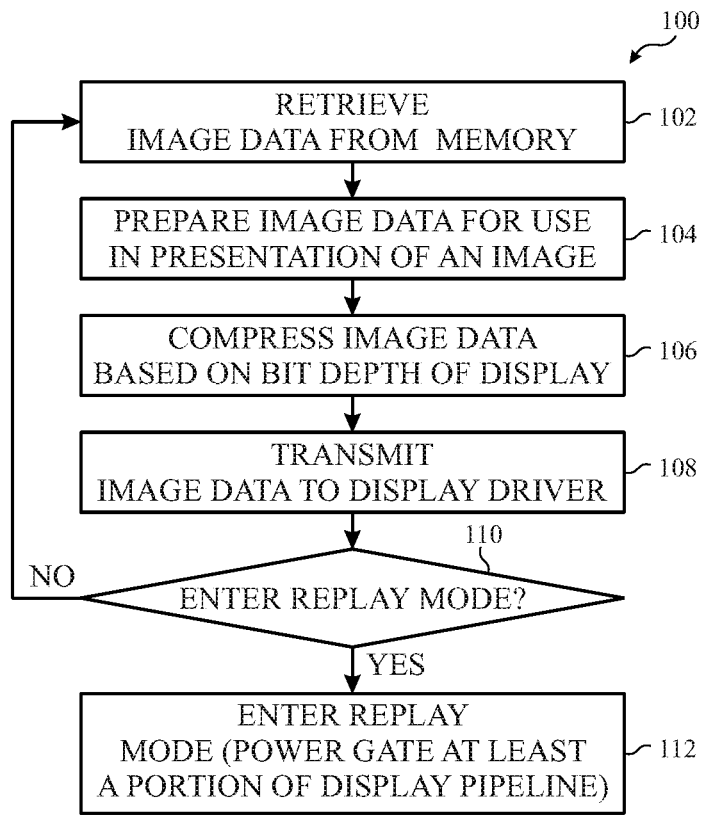
FIG. 11 is a functional diagram of processing image data with consideration for bit depth reductions while determining whether to operate the display pipe of FIG. 8 in a replay mode, in accordance with an embodiment.

To elaborate, FIG. 11 is a functional diagram of a method 100 used when operating the display pipe 36 to prepare image data for use in presentation of an image frame. Although the method 100 is described below as performed by the controller 42, it should be noted that the method 100 may be performed by any suitable processor or any other suitable component, such as by a portion or circuitry of the display pipe 36. Moreover, although the following description of the method 100 is described in a particular order, it should be noted that the method 100 may be performed in any suitable order.

At block 102, the controller 42 may operate the display pipe 36 to retrieve image data from the memory 20 and/or the controller memory 52. In some embodiments, the image source 38 may have stored the image data into the memory cache 39 and the display pipe 36 retrieves the image data from the memory cache 39. The image data stored in the memory 20, the controller memory 52, and/or the memory cache 39 may be a pre-rendered frame that is to now undergo further processing to prepare for presentation via the display 12.

At block 104, the controller 42 may operate the display pipe 36 to prepare the image data for use in presentation of an image via the display 12. The display pipe 36 may process the image data using the frame generator 44 of the display pipe 36. As described above, the frame generator 44 may include one or more blocks to perform manipulation (e.g., processing, compositing) of the data, conversion of the data from source data to display data, a sub-pixel layout resampler (SPLR), a gain block, an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dither block, a sub-pixel uniformity compensation (SPUC) block, a content frame dependent duration (CDFD) block, an ambient light sensing (ALS) block, or any combination thereof. In this way, the display pipe 36 may determine one or more current operating conditions and may base one or more processing operations on the image data on at least the determined operating conditions. For example, the display pipe 36 may receive a brightness indication from the controller 42 indicating how bright an ambient light is of the electronic device 10 such that processing of the image data may be suitably adjusted to compensate for the ambient light surrounding the electronic device 10.

At block 106, the controller 42 may operate the display pipe 36 to transmit the processed image data to the dither block 54 for compression into the second bit depth (e.g., the bit depth of the display 12). This compression may occur in response to the controller 42 determining at block 84 of the method 80 shown in FIG. 10 to include compression of image data via the dither block 54 (e.g., dither block compression) in the display pipe 36. Thus, it follows that inclusion of dither block compression into the image processing operations may be optional and based at least in part on a result of the determination made by the controller 42, such as during operation according to the method 80. The dither block 54 may compress the image data from the first bit depth of the display pipe 36 to the second bit depth of the display 12. The image data may be compressed using any suitable, lossless compression technique. After compressing the image data, the dither block 54 may append buffer data to the compressed image data to increase a bit depth of the compressed image data to return to equaling the first bit depth. In this way, when the compressed image data (e.g., compressed image data having appended buffer data) is transmitted to the display 12, no actual image data (e.g., compressed image data not having appended buffer data) is lost during the transmission, as illustrated in FIG. 7B. As a reminder, the buffer data is lost during the data truncation instead of uncompressed image data (e.g., such as may occur when uncompressed image data is transmitted from the display pipe 36 to the display 12, as illustrated in FIG. 7A).

After processing and any dither block compression, at the block 108, the controller 42 may cause the display pipe 36 to transmit the processed image data (e.g., processed image data or processed and compressed image data) to the display 12. In some embodiments, the display 12 may couple to the display pipe 36 via the display driver 40, and thus may receive the processed image data at least in part from the display driver 40. Upon receiving the processed image data, the display driver 40 may generate one or more control signals to operate the display 12 to present an image frame based on the processed image data.

At block 110, the controller 42 may determine whether to operate the display pipe 36 to enter a replay mode (e.g., a frame replay operational mode). For example, the controller 42 may determine to enter replay mode based at least in part on whether there is temporal variance in processing between a first image and a second, subsequent image. The display pipe 36 may enter the replay mode when the image is static for at least a threshold number of frames (e.g., repeated for a particular number of image frames). While in the replay mode, the display pipe 36 retrieves the previous image data from memory 20, controller memory 52, and/or the memory cache 39 to replay the displayed frame. When the displayed image frame is replayed, a reduced amount of processing is performed to the previous image data to prepare to repeat the displayed image frame. In this way, the controller 42 may operate the display pipe 36 to power-gate (e.g., reduce or remove power) one or more components of the display pipe 36 not used in the reduced amount of processing. In response to determining not to operate the display pipe 36 to enter the replay mode, the controller 42 may repeat operations of the method 100 and may retrieve, at the block 102, next image data from the memory 20, controller memory 52, and/or the memory cache 39 for use in presenting a next frame. The next image data may be retrieved while an image is being presented on the display 12 and this retrieval may happen several display cycles early.

However, at block 112, the controller 42 may operate the display pipe 36 to enter the replay mode in response to determining to that one or more entrance conditions were met to operate the display pipe 36 to enter the replay mode (e.g., the next image to be presented was determined to be the same as a currently presented image). It is noted that the controller 42 may determine whether consecutive images are substantially similar and/or the same, and/or other suitable processing circuitry (such as one or more components of the display pipe 36) may determine whether consecutive images are substantially similar and/or the same and indicate to the controller 42 that an entrance condition is satisfied. In this way, the display pipe 36 and/or the controller 42 may monitor generated images, generated image frames, and/or generated image data for changes in content (e.g., to determine if the content of successive frames is static). Furthermore, the controller 42 may share at least a portion of the processing and/or determination with at least a portion of the display pipe 36. The controller 42 may determine to operate the display pipe 36 to enter the replay mode in response to determining that conditions are met for the display pipe 36 to enter the replay mode. Any suitable condition may be used by the controller 42. For example, the controller 42 may determine that a next image frame is substantially similar (e.g., the same) to a current frame being displayed by determining that a threshold amount of image data for the two images is identical between two frames of image data, and thus may be replayed. In one example, the next image frame may be considered the substantially similar (e.g., the same) as the current image frame when the two frames share a threshold number of identical pixels (e.g., 100% identical pixels, 99% identical pixels, 95% identical pixels, 90% identical pixels). In another example, the next image frame may be considered substantially similar (e.g., the same) as the current image frame when there is a threshold number of pixels that are within a range of similarity to one another (e.g., a threshold number of pixels located in the same spatial locations of both frames do not change more than a threshold amount, such as remaining within a threshold number of gray levels). The threshold amount of image data (e.g., used to determine whether a threshold similarity is met) may correspond to a bit depth at which the image data can be different at as long as after dithering and/or truncation operations, the bit depth of the images are the same. Entering the replay mode may include power gating at least a portion of the display pipe 36. For example, the controller 42 may power gate portions of the display pipe 36 responsible for processing new image data in response to the display pipe 36 entering the replay mode.

Figure 12:
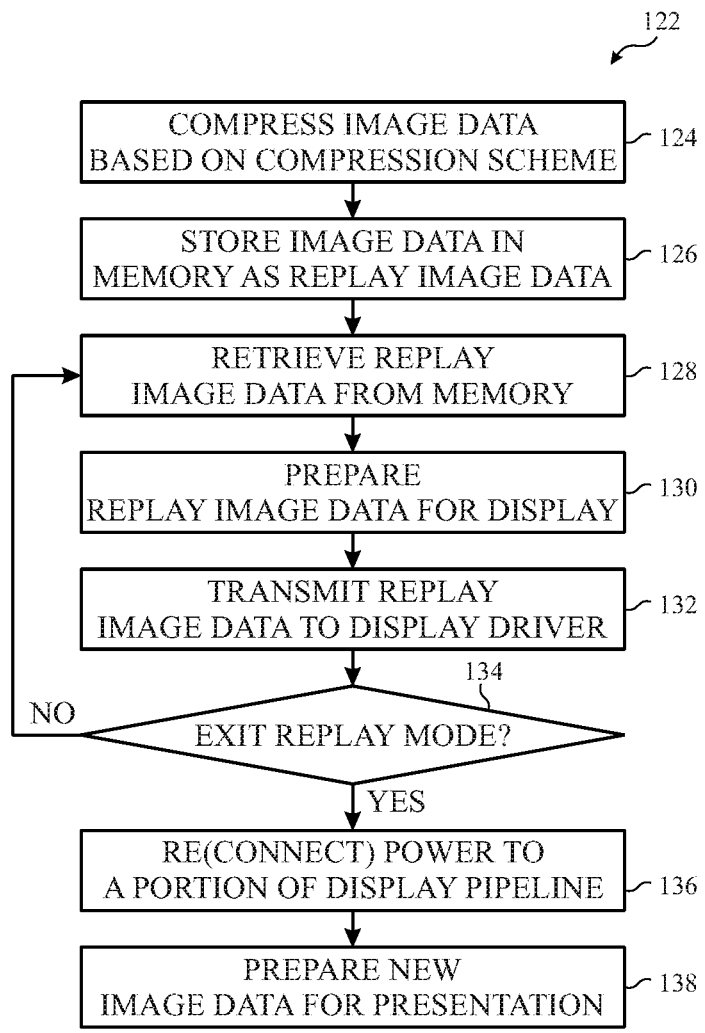
FIG. 12 is a functional diagram of processing image data with consideration for bit depth reductions while the display pipe of FIG. 8 is in the replay mode, in accordance with an embodiment.

While in the replay mode, the controller 42 may operate the display pipe 36 to retrieve image data from the memory 20, the controller memory 52, and/or the memory cache 39 and perform a reduced amount of processing on the image data prior to using the image data to present the frame. To elaborate, FIG. 12 is a functional diagram of a method 122 used when operating the display pipe 36 in a replay mode to prepare image data for use in presentation of an image frame. Although the method 122 is described below as performed by the controller 42, it should be noted that the method 122 may be performed by any suitable processor or any other suitable component, such as by a portion or circuitry of the display pipe 36. Moreover, although the following description of the method 122 is described in a particular order, it should be noted that the method 122 may be performed in any suitable order.

At block 124, the controller 42 may operate the display pipe 36 to compress the image data based on a compression scheme and, at block 126, to store the compressed image data to the memory 20, the controller memory 52, and/or the memory cache 39 as replay image data. The display pipe 36 via the compressor 46 compresses the image data to a relatively smaller data size. This may save computing resources (e.g., reduce a consumption of memory to store the replay frame) and thus, may improve operation of the electronic device 10. In some embodiments, the compressor 46 compresses the image data using a compression scheme that leverage the dividing circuitry 58, the residual transform circuitry 60, and/or the entropy coder 62. The dithering operations may be performed before the compressing operations (e.g., the compression of the image data based on a compression scheme). Thus, the controller 42 may compress previously compressed image data, at the block 124, and may store at least twice-compressed image data into the memory 20, the controller memory 52, and/or the memory cache 39, at the block 126, as the replay image data. It should be understood that additional compression (and accompanying decompression) operations may be performed in addition to the dithering operations and/or the compressing operations.

At block 128, the controller 42 may operate the display pipe 36 to retrieve replay image data from the memory 20, the controller memory 52, and/or the memory cache 39 and, at block 130, may operate the display pipe 36 to prepare the replay image data for presentation via the display 12. The controller 42 may retrieve the compressed image data from the memory 20, the controller memory 52, and/or the memory cache 39 as the replay image data and prepare the compressed image data for presentation. Preparing the replay image data for presentation may include decompressing the replay image data (e.g., compressed image data) back to the first bit depth. As a reminder, twice-compressed image data may still be decompressed, at the block 130, to the first bit depth since the twice-compressed image data is compressed, at the block 124, with the buffer data appended to the compressed image data having the first bit depth.

At block 132, the controller 42 may operate the display pipe 36 to transmit the replay image data ready for use in presentation of a frame via the display 12. The controller 42 may operate the display pipe 36 to transmit the replay image data to the display driver 40. At block 134, the controller 42 may determine whether to operate the display pipe 36 to exit the replay mode or whether to continue operating the display pipe 36 in the replay mode. The display pipe 36 may remain in the replay mode until an exit condition is met and/or detected by the controller 42. The exit condition may include the controller 42 receiving a notification of a new image frame and/or detecting changed image data sent to the display pipe 36 for image processing. Upon exit from the replay mode, the electronic device 10 may present a new image frame via the display 12.

In response to determining to continue to operate the display pipe 36 in the replay mode, the controller 42 may proceed, at the block 128, to operate the display pipe 36 to retrieve the replay image data from the memory 20, the controller memory 52, and/or the memory cache 39. The controller 42 may continue to operate the display pipe 36 in the replay mode upon determining that the image frame does not change an image presented via a currently displayed image frame. In this way, the controller 42 may analyze incoming image data (such as to determine that the image to be presented is unchanged), ambient conditions (such as to determine that additional processing of the image data is unchanged), or the like, to determine whether it is suitable to maintain the display pipe 36 in the replay mode.

In response to determining to operate the display pipe 36 to exit the replay mode, at block 136, the controller 42 may reconnect power to a portion of the display pipe 36 and, at block 138, may prepare new image data for presentation (e.g., operating based at least in part on the method 100 of FIG. 11). In the method 100, the controller 42 power gated at least a portion of the display pipe 36 that is idle during the replay mode. Now, upon exit from the replay mode, the controller 42 may return power to the portion of the display pipe 36 (e.g., reconnect power in the case of a disconnection or powering off) that was previously power gated, such as at the block 112. When the portion of the display pipe 36 is suitably powered-on (or suitably returned to full power) and any configurations are applied to the portion upon power-on, the display pipe 36 may prepare new image data for presentation of a next image. To do this, the controller 42 may repeat operations of FIG. 11, such as at the block 102, to retrieve image data (e.g., new image data).

Thus, the technical effects of the present disclosure include reducing power consumption of an electronic device, for example, by improving a technique of managing power supplied to a display pipe. These techniques describe selectively power-gating, powering-on, and powering-off a display pipe to reduce an amount of power consumed by the electronic device. These techniques additionally describe dithering operations that enable a controller to operate the display pipe to present an image without loss of image data to truncation when the display pipe does not have a bit depth equal to that of its corresponding display. In this way, the display pipe may transmit image data to a display while compensating for a bit depth reduction between the display pipe and the display. To do this, the display pipe may compress image data having a first bit depth (e.g., a bit depth of the display pipe) into compressed image data having a second bit depth (e.g., a bit depth of the display). The display pipe may append buffer data to the compressed image data, such upon transmission to the display, just the appended buffer data is lost to the bit depth truncation. This compression may be integrated into the operation of the display pipe and used with power consumption reduction techniques associated with a replay mode.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
   a display pipe comprising image data processing circuitry configured to improve perceived image quality by processing of image data corresponding to images for presentation;
   a display coupled to the display pipe and configured to receive image data from the display pipe, wherein the display is configured to present images based on corresponding image data; and
   a controller configured to:
     determine whether image data truncation is expected to occur when transmitting a first image data from the display pipe to the display to cause a presentation of a first image; and
     operate the display pipe to:
       process the first image data using the image data processing circuitry;
       compress the first image data to a first bit depth to generate compressed image data, wherein the first bit depth is configured to be sufficient to avoid the image data truncation from altering the first image data;
       generate processed image data at least in part by performing a bit depth expansion on the compressed image data such that the processed image data comprises the compressed image data and buffer data; and
       transmit the processed image data to the display for use in presentation of a corresponding image.

2. The electronic device of claim 1, wherein the controller is configured to determine whether the image data truncation is expected to occur based at least in part on a comparison between the first bit depth and a second bit depth, wherein the first bit depth is configured to be used by the display when presenting the corresponding image, and wherein the second bit depth is configured to be used by the image data processing circuitry when processing the first image data.

3. The electronic device of claim 2, wherein the controller is configured to determine that the image data truncation is expected to occur when the second bit depth is greater than the first bit depth.

4. The electronic device of claim 1, wherein the display pipe comprises a dither block configured to compress the first image data to the first bit depth.

5. The electronic device of claim 4, wherein the dither block is programmable, and wherein the controller is configured to define a value of the first bit depth through programming the dither block.

6. The electronic device of claim 5, wherein the controller is configured to program the dither block at a time of power-on of the display pipe.

7. The electronic device of claim 5, wherein the controller is configured to program the dither block in response to receiving an indication of the first bit depth from the display.

8. The electronic device of claim 1, wherein the display pipe comprises a compressor, and wherein the controller is configured to:
   determine whether a second image to be presented is the same as the first image; and
   operate the display pipe to repeat the first image data instead of processing second image data corresponding to the second image in response to determining the second image to be presented is the same as the first image.

9. The electronic device of claim 8, wherein the controller is configured to operate the display pipe to repeat the first image data at least in part by operating the display pipe to:
   compress the first image data to generate replay image data via the compressor;
   store the compressed first image data as replay image data; and
   prepare the replay image data for presentation via the display instead of the second image data.

10. The electronic device of claim 9, wherein the display pipe comprises a decompressor, and wherein the controller is configured to operate the display pipe to prepare the replay image data for presentation at least in part by decompressing the replay image data for use in presentation via the display instead of the second image data.

11. The electronic device of claim 8, wherein the second image data is received after the presentation of the first image on the display.

12. The electronic device of claim 8, wherein the controller is configured to power gate at least a portion of the display pipe into a reduced-power state in response to determining the second image to be presented the same as the first image.

13. The electronic device of claim 1, wherein the electronic device comprises a portable phone, a media player, a personal data organizer, a handheld game platform, a tablet device, a computer, or any combination thereof.

14. A tangible, non-transitory, computer-readable medium that stores instructions executable by one or more processors of an electronic device that cause the one or more processors to:
   determine whether image data truncation is expected to occur when transmitting image data from a display pipe to a display driver, wherein the display driver is configured to cause presentation of an image corresponding to the image data in response to receiving the image data from the display pipe;
   instruct the display pipe to compress the image data to a first bit depth to generate compressed image data, wherein the first bit depth is configured to be sufficient to avoid the image data truncation from altering the image data; and
   instruct the display pipe to generate processed image data at least in part by performing a bit expansion on the compressed image data such that the image data comprises the compressed image data and buffer data.

15. The tangible, non-transitory computer-readable medium of claim 14, comprising instructions that cause the one or more processors to:
   determine whether the image data truncation is expected to occur based at least in part on a comparison between the first bit depth and a second bit depth, wherein the display driver is configured at the first bit depth, and wherein the display pipe is configured at the second bit depth.

16. The tangible, non-transitory computer-readable medium of claim 14 comprising instructions that cause the one or more processors to:
   determine to operate the display pipe in a replay mode in response to a next image being the same as a current image presented via the display driver, wherein two images are considered identical when a threshold amount of image data is identical between the two images; and
   when the next image to be presented is the same as the current image presented, operate the display pipe in the replay mode, wherein the replay mode is configured to cause the display pipe to repeat the current image without repeating at least one processing operation on image data of the next image.

17. A method for operating a display pipe having a first bit depth and implemented in an electronic device, comprising:
   determining a second bit depth of a display;
   compressing first image data to the second bit depth, wherein the first image data corresponds to a first image to be presented via the display;
   generating processed image data at least in part by performing a bit expansion on the compressed first image data such that the processed image data comprises the compressed first image data and buffer data; and
   transmitting the processed image data as output image data to cause presentation of the first image, wherein the buffer data is configured to be truncated during the transmission of the output image data.

18. The method of claim 17, wherein the buffer data is configured to comprise a bit length equal to a difference between the first bit depth and a second bit depth.

19. The method of claim 17, wherein outputting the processed image data as the output image data to cause presentation of the first image comprises:
   determining whether to operate in a replay mode based at least in part on whether there is temporal variance in processing between the first image and a second image;
   compressing the processed image data to generate twice-compressed image data in response to determining to operate in the replay mode;
   storing the twice-compressed image data into a memory; and
   outputting the twice-compressed image data as the output image data to cause presentation of the first image.

20. The method of claim 19, comprising:
   determining whether a third image has at least a threshold similarity to the first image;

retrieving the twice-compressed image data from the memory in response to determining the third image comprises a threshold amount of identical image data relative to the first image without processing third image data of the third image; and outputting the twice-compressed image data as the output image data to cause presentation of the third image, wherein the presentation of the third image is configured to be a replaying of the first image and the second image.

\* \* \* \* \*